Aug. 6, 1935.  F. M. WHYTE  2,010,576
SHEARS
Filed May 19, 1933
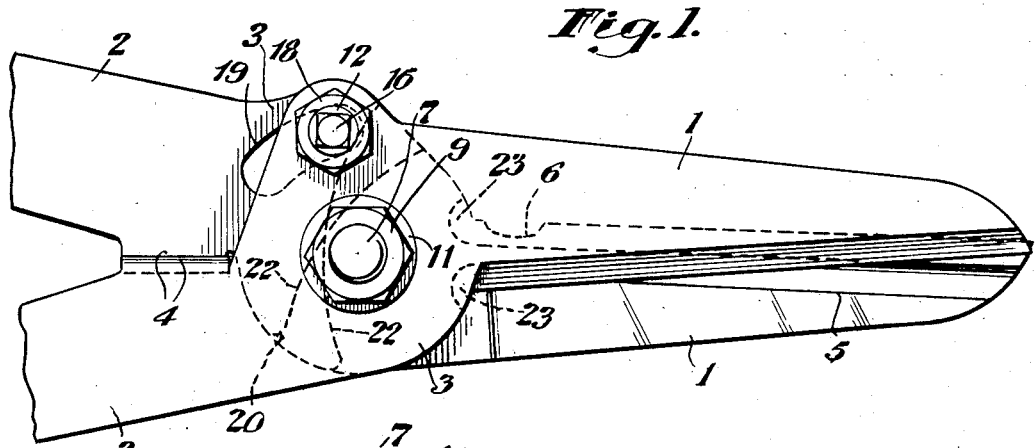
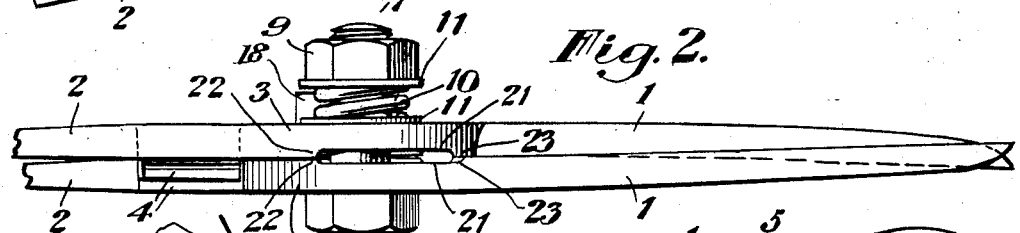
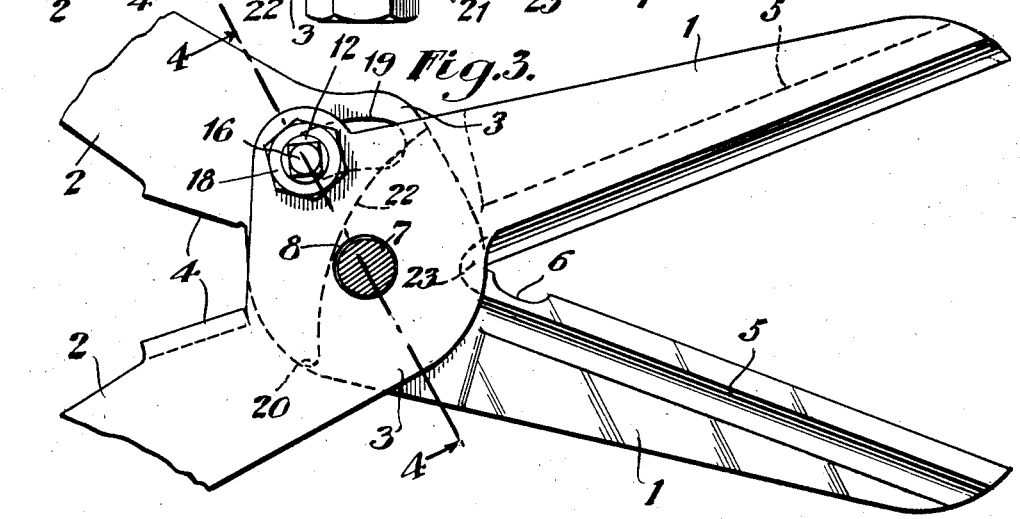
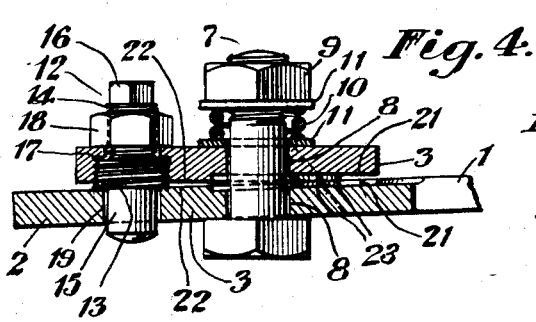
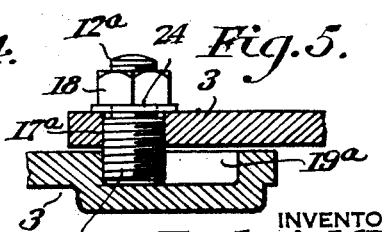
INVENTOR
Frederic M. Whyte
BY
Davis Davis
ATTORNEYS Patented Aug. 6, 1935

2,010,576

UNITED STATES PATENT OFFICE 2,010,576

SHEARS

Frederic M. Whyte, Tarrytown, N. Y.

Application May 19, 1933, Serial No. 671,811

8 Claims. (Cl. 30—13)

This invention is described more particularly as relating to improvements in garden shears or hedge shears but is not limited in application to such shears. An important object of the invention is to provide improved means to obtain effective shearing coaction of the blades and also render the shears self-sharpening.

Other objects of the invention will appear hereinafter.

In the drawing, Fig. 1 is a face view of shears embodying the invention, with the shears closed and the handle portions broken away;

Fig. 2 a side edge view of the shears with the blades swung open;

Fig. 3 a face view of the opened shears, with the pivot bolt in section;

Fig. 4 a section approximately on the line 4—4 of Fig. 3; and

Fig. 5 a sectional view showing a modification of the stop means for limiting the movement of the blades.

The shears embodying the invention are in general of a standard design. They comprise pivotally connected members each of which has a blade portion 1, a handle portion 2 and a substantially flat, disk-like hub portion 3 between the blade and handle portions. As shown in Fig. 2, the blades are bowed or splayed for shearing coaction. The hub portions are connected by a pivot joint and, adjacent the hub portions, the handles 2 have opposed abutments 4 to limit the closing movement of the blades. When the shears are closed the blades partly overlap as shown in Fig. 1. The blades are longitudinally grooved at their opposed faces, as at 5. One blade is notched at its cutting edge as at 6 for cutting thick stalks or branches which might otherwise slide along the blades. The design of the shears may be varied however.

The pivot joint comprises a headed bolt 7 which is passed through central apertures 8 in the hub portion 3. The shank of the bolt is materally longer than the thickness of the pivoted members. Its diameter is materially less than that of the holes 8 to afford a desired clearance. A nut 9 is screwed upon the shank and, in the preferred form of the invention, a coiled compression spring 10 encircles the shank between the nut and the adjacent hub member. The nut is screwed inward to place the spring under a desired compression. Washers 11 also are preferably placed on the bolt to afford abutments for the spring. The compressed spring exerts a thrust along the pivot tending to force the pivoted members together.

To obtain and maintain effective shearing coaction at the cutting edges of the blades, the shears are provided with means to relatively tilt the blades transversely of their cutting edges. Said means comprise a spacing pin 12 having an enlarged screw threaded medial portion 13 and reduced end portions 14 and 15. The end portion 14 is screw threaded and has a squared extremity 16 to receive a wrench. The hub portion of one of the pivoted members has an aperture 17 to receive the spacing pin. This aperture is spaced radially outward a material distance from the pivot bolt, in a direction transversely of the cutting edges of the blades. At the under face of said hub portion the aperture is screw threaded to receive the larger threaded portion 13 of the spacing pin. At the outer face of the hub portion the aperture is reduced and unthreaded and the smaller threaded portion 14 of the pin protrudes therethrough and has a lock nut 18 screwed upon it to lock the pin to said hub portion. The opposed hub portion of the other pivoted member has an arcuate slot 19 through which the end 15 of the spacing pin protrudes. Said slot is concentric with the pivot axis and, by engagement of said end of the pin with one end of the slot, the opening movement of the blades is limited.

One of the pivoted members is tilted on the other by screwing down the spacing pin to thrust the enlarged portion 13 of the pin against the opposed hub at the margins of the slot 19. Thereby the pivoted members are relatively tilted to bring the blades into more effective shearing relation. To ensure accurate transverse tilting of one blade on the other there is provided a three point wiping bearing contact between the pivoted members. One bearing point occurs at the spacing pin 12, one at the margins of the cutting edges of the blades and the third, indicated at 20, is on a line with said second point extending longitudinally of the cutting edge of one of the blades and on the opposite side of the pivot from the spacing pin 12. Thus the three bearing points are arranged in triangular relation and the pivot joint is located within the triangle. By screwing down the spacing pin one of the pivoted members is tilted, against the resistance of spring 10, transversely on said second and third bearing points, the three bearing points making a controlled stable contact between the pivoted members. In the closing movement of the blades said second bearing point progresses toward the ends of the blades. When the shears are opened said second point recedes inward along the blades. Said bearing point occurs always at the shearing point, and the spring 10 acts to press the blades together at this point for effective shearing co-action. The contact point 20 and the contact point at the pin 12 remain always in a fixed relation to each other on one of the pivoted members, and the opposed hub face of the other pivoted member affords trackage over which said two contact points travel as the shears are opened and closed. The fixed relation of said points on the trackage maintains the triangular arrangement of the three points of contact during the opening and closing of the shears and enables the pin 12 to hold one of the blades tilted on the other in all open and closed positions of the blades. As the shears are closed any springing in the bowed blades as they overlap acts similarly to spring 10 to produce pressure at the three bearing points. If desired, the spring of the blades may be made sufficient to entirely replace spring 10.

To obtain the spaced points of bearing contact at 20 and at the cutting edges of the blades the opposed faces of the pivoted members are depressed or recessed, as at 21, from a point back of the pivot to a point adjacent the inner edges of the cutting blades. This leaves opposed portions 22 in relief, and opposed portions 23 in relief to form said bearing contact points. All of said portions in relief are flat and smooth. Between said bearing points the pivoted members are out of contact. The portions 23 are flush and continuous with the margins of the cutting edges and they are coincident when the shears are fully opened. Of course said two spaced bearing points may be obtained by recessing only one of the hub faces.

It will be seen that my invention provides for easy adjustment of the shears to produce a desired pressure at the three bearing points and obtain a desired shearing efficiency. By adjustment of the nut 9 the desired spring compression and blade pressure is obtained, and by adjustment of the pin 12 the desired blade tilt is obtained. The adjustment of the pin is maintained by screwing down the lock nut 18. The invention also renders the shears self-sharpening by holding the cutting margins of the blades in close wiping contact under spring pressure as the shears are opened and closed. The invention can be employed advantageously in shears designed for various purposes.

While the degree of transverse relative tilt of the blades may be varied by adjustment of the pin 12 it cannot be entirely eliminated by careless adjustment. Contact of the enlarged portion 13 of the pin with a stop margin or shoulder around the reduced portion of the aperture 17 (see Fig. 4) positively limits screwing of the pin into said aperture and thereby limits reduction of the transverse tilt.

In the modification of the stop means, shown in Fig. 5 the slot 19 is replaced by a depression or groove 19ª in one of the hub portions. The spacing pin or screw, here designated 12ª is modified by omitting the reduced end 15 of screw 12 and extending the enlarged threaded portion 13ª to bear against the bottom of the groove. Contact of the screw with the ends of the groove limits the swing of the blades. Said portion 13ª is screwed straight through the threaded aperture 17ª and the lock nut 18 bears against a washer 24. The groove may be closed all around to contain lubricant. Or, its outer wall may be omitted. Other modifications of the stop means are also possible. The stop means ensures the maintenance of the three point bearing contact between the pivoted members. The pin and slot, or pin and groove stop means can be made to serve for limiting the closing of the shears as well as the opening thereof, dispensing with the stops 4.

What I claim is:

1. Shears comprising coactive blade and handle members with medial portions thereof overlapped, a pivot joint between said overlapped medial portions operatively connecting said members and having clearance for relative shift between the members axially of the pivot and permitting one member to be tilted both transversely and longitudinally on the other for floating pivotal connection of one member with the other, the members having mutual wiping bearing contact at three points only in triangular arrangement, with the pivot axis enclosed by the triangle, said three point contact supporting the tiltable member tilted transversely for effective shearing coaction with the other member, one of said points being at the margins of the cutting edges of the blades and shiftable back and forth along the blades by opening and closing of the shears, another of the points being spaced longitudinally rearward from the cutting edge of one of the members beyond the pivot axis, and the third point being spaced transversely toward the back edge of said member and transversely back of said second point and transversely back of the pivot joint, and in a fixed spaced relation to said second point, the degree of transverse tilt of the tiltable member being governable at said third point and non-governable at the second point, positive stop means to positively limit reduction of said transverse tilt and spring means at the pivot joint and active axially thereof to maintain said three point mutual contact between the blade and handle members and yieldable to permit longitudinal tilting of the tiltable member about said second and third bearing points as a fulcrum and transverse tilting about said first and second points as a fulcrum.

2. Shears comprising coactive blade and handle members with medial portions thereof overlapped, a pivot joint between said overlapped medial portions operatively connecting said members and having clearance for relative shift between the members axially of the pivot and permitting one member to be tilted both transversely and longitudinally on the other for floating pivotal connection of one member with the other, the members having mutual wiping bearing contact at three points only in triangular arrangement, with the pivot axis enclosed by the triangle, said three point contact supporting the tiltable member tilted transversely for effective shearing coaction with the other member, one of said points being at the margins of the cutting edges of the blades and shiftable back and forth along the blades by opening and closing of the shears, another of the points being spaced longitudinally rearward from the cutting edge of one of the members beyond the pivot axis, and the third point being spaced transversely toward the back edge of said member and transversely back of said second point and transversely back of the pivot joint and in fixed spaced relation to the second point, the degree of transverse tilt of the tiltable member being governable at said third point and non-governable at the second point, and spring means at the pivot joint and active axially thereof to maintain said three point mutual contact between the blade and handle members and yieldable to permit longitudinal tilting of the tiltable member about said second and third bearing points as a fulcrum and transverse tilting about said first and second points as a fulcrum.

3. Shears comprising coactive blade and handle members with medial portions thereof overlapped, a pivot joint between said overlapped medial portions operatively connecting said members and having clearance for relative shift between the members axially of the pivot and permitting one member to be tilted both transversely and longitudinally on the other for floating pivotal connection of one member with the other, the members having mutual wiping bearing contact at three points only in triangular arrangement, said three point contact supporting the tiltable member tilted transversely for effective shearing coaction with the other member, one of said points being at the margins of the cutting edges of the blades and shiftable back and forth along the blades by opening and closing of the shears, another of the points being spaced longitudinally rearward from the cutting edge of one of the members, and the third point being spaced transversely toward the back edge of said member and transversely back of said second point and transversely back of the pivot joint and in fixed spaced relation to the second point, and spring means at the pivot joint and active axially thereof to maintain said three point mutual contact between the blade and handle members and yieldable to permit longitudinal tilting of the tiltable member about said second and third bearing points as a fulcrum.

4. Shears comprising coactive blade and handle members with medial portions thereof overlapped, a pivot joint between said overlapped portions operatively connecting said members and having clearance for relative shift between the members axially of the pivot and permitting one member to be tilted both transversely and longitudinally on the other for floating pivotal connection of one member to the other, the members having mutual bearing contact at three points only in triangular arrangement, with the pivot axis enclosed by the triangle, and the blades being longitudinally bowed for shearing coaction, one of said points being at the margins of the cutting edges of the bowed blades and shiftable back and forth along the blades by opening and closing of the shears, another of the points being spaced longitudinally rearward from the cutting edge of one of the members beyond the pivot axis, and the third point being spaced transversely toward the back edge of said member and transversely back of said second point and transversely back of the pivot joint and in a fixed spaced relation to said second point, and spring means at the pivot joint and constantly active axially thereof to maintain said three point mutual contact and yieldable to permit rocking of one member on the other about said second and third points as a fulcrum as said first point advances and recedes along the bowed blades in the closing and opening of the shears.

5. Shears comprising coactive blade and handle members with medial portions thereof overlapped, a pivot joint between said overlapped medial portions operatively connecting said members and having clearance for relative shift between the members axially of the pivot and permitting one member to tilt on the other, the members having mutual bearing contact at three points only in triangular arrangement around the pivot and supporting said tiltable member transversely tilted on the other member for effective shearing coaction therewith, one of said points being at the margins of the cutting edges of the blades and shiftable back and forth along the blades by opening and closing of the shears, another of the points being spaced longitudinally rearward from the cutting edge of one of the members and the third point being spaced transversely toward the back edge of said member and transversely back of said second point and transversely back of the pivot and in a fixed spaced relation to said second point, said member, to form said second and third points of contact, having contact point elevations in constantly fixed spaced relation to each other and the other member having bearing areas opposed to said contact elevations and providing trackage for the latter to travel over in the opening and closing of the shears; and spring means to exert compression constantly upon said members axially of the pivot to maintain mutual bearing contact at said three points.

6. Shears comprising coactive blade and handle members with medial portions thereof overlapped, and a pivot joint between said overlapped medial portions operatively connecting said members, the members having mutual bearing contact at three points only in triangular arrangement around the pivot and supporting one member transversely tilted on the other member for effective shearing coaction therewith, one of said points being at the margins of the cutting edges of the blades and shiftable back and forth along the blades by opening and closing of the shears, another of the points being spaced longitudinally rearward from the cutting edge of one of the members and the third point being spaced transversely toward the back edge of said member and transversely back of said second point and transversely back of the pivot and in a fixed spaced relation to said second point, said member, to form said second and third points of contact, having contact point elevations in constantly fixed spaced relation to each other and the other member having bearing areas opposed to said contact elevations and providing trackage for the latter to travel over in the opening and closing of the shears.

7. Shears comprising coactive blade and handle members with medial portions thereof overlapped; a pivot joint between said overlapped medial portions; mutual bearing contact means between said members to hold one member constantly tilted transversely in one direction on the other member in all open and closed positions of the members for effective shearing coaction of the blades; and spring means to exert compression constantly upon said members axially of the pivot and maintain mutual bearing contact between the said bearing contact means in all open and closed positions of the blades.

8. Shears comprising coactive blade and handle members with medial portions thereof overlapped; a pivot joint between said overlapped medial portions; and mutual bearing contact means between said members to hold one member constantly tilted transversely in one direction on the other member in all open and closed positions of the members, for effective shearing coaction of the blades.

FREDERIC M. WHYTE.